(12) United States Patent
Burr et al.

(10) Patent No.: US 9,058,315 B2
(45) Date of Patent: *Jun. 16, 2015

(54) SYSTEM AND METHOD FOR PARAMETERIZING DOCUMENTS FOR AUTOMATIC WORKFLOW GENERATION

(71) Applicant: Palantir Technologies, Inc., Palo Alto, CA (US)

(72) Inventors: Brandon Burr, Palo Alto, CA (US); Akshay Pundle, Palo Alto, CA (US); Kevin Simler, Fremont, CA (US); Nick Miyake, Palo Alto, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/265,637

(22) Filed: Apr. 30, 2014

(65) Prior Publication Data

US 2014/0237354 A1    Aug. 21, 2014

Related U.S. Application Data

(63) Continuation of application No. 13/218,238, filed on Aug. 25, 2011, now Pat. No. 8,732,574.

(51) Int. Cl.
*G06F 17/00* (2006.01)
*G06F 17/24* (2006.01)
*G06Q 10/10* (2012.01)
*G06Q 40/02* (2012.01)

(52) U.S. Cl.
CPC ............... *G06F 17/24* (2013.01); *G06Q 10/10* (2013.01); *G06Q 40/02* (2013.01)

(58) Field of Classification Search
CPC ............ G06F 17/2241; G06F 17/2247; G06F 17/30716; G06F 17/30961
USPC ......................................................... 715/255
See application file for complete search history.

(56) References Cited

U.S. PATENT DOCUMENTS 5,241,625 A    8/1993    Epard et al.
5,845,300 A    12/1998    Comer et al.
(Continued)

FOREIGN PATENT DOCUMENTS

EP    1672527    6/2006
WO    WO0125906    4/2001
(Continued)

OTHER PUBLICATIONS

Worklets: A Service-Oriented Implementation of Dynamic Flexibility in Workflows, Adams et al., R. Meersman, Z. Tari et al. (Eds.): OTM 2006, LNCS, 4275, pp. 291-308, 2006.*

(Continued)

*Primary Examiner* — Kavita Padmanabhan
*Assistant Examiner* — Andrew McIntosh
(74) *Attorney, Agent, or Firm* — Hickman Palermo Becker Bingham LLP

(57) ABSTRACT

One embodiment of the present invention sets forth a method for generating a new workflow for an application. The method includes generating a parameter tree related to a current workflow, wherein the parameter tree includes a different node corresponding to each parameter included in one or more documents associated with the current workflow, modifying a value associated with a first node included in the parameter tree based on an input, wherein the first node corresponds to a first parameter included in a first document associated with the current workflow, evaluating a second document associated with the current workflow based on the modified value associated with the first node, and generating the new workflow based on the evaluated second document.

18 Claims, 7 Drawing Sheets

(56) References Cited

U.S. PATENT DOCUMENTS

| | | | |
|---|---|---|---|
| 5,999,911 A * | 12/1999 | Berg et al. | 705/7.26 |
| 6,065,026 A | 5/2000 | Cornelia et al. | |
| 6,236,994 B1 | 5/2001 | Swartz et al. | |
| 6,237,138 B1 | 5/2001 | Hameluck et al. | |
| 6,243,706 B1 | 6/2001 | Moreau et al. | |
| 6,370,538 B1 * | 4/2002 | Lamping et al. | 1/1 |
| 6,523,019 B1 | 2/2003 | Borthwick | |
| 6,944,821 B1 | 9/2005 | Bates et al. | |
| 7,174,377 B2 | 2/2007 | Bernard et al. | |
| 7,392,254 B1 | 6/2008 | Jenkins | |
| 7,519,589 B2 | 4/2009 | Charnock et al. | |
| 7,853,573 B2 | 12/2010 | Warner et al. | |
| 7,877,421 B2 | 1/2011 | Berger et al. | |
| 7,880,921 B2 | 2/2011 | Dattilo et al. | |
| 8,302,855 B2 | 11/2012 | Ma et al. | |
| 8,429,527 B1 | 4/2013 | Arbogast | |
| 8,732,574 B2 | 5/2014 | Burr et al. | |
| 2002/0032677 A1 | 3/2002 | Morgenthaler et al. | |
| 2002/0095360 A1 | 7/2002 | Joao | |
| 2002/0103705 A1 | 8/2002 | Brady | |
| 2002/0184111 A1 | 12/2002 | Swanson | |
| 2003/0004770 A1 | 1/2003 | Miller et al. | |
| 2003/0093755 A1 * | 5/2003 | O'Carroll | 715/500 |
| 2004/0034570 A1 | 2/2004 | Davis | |
| 2004/0044648 A1 | 3/2004 | Anfindsen et al. | |
| 2004/0205492 A1 | 10/2004 | Newsome | |
| 2005/0010472 A1 | 1/2005 | Quatse et al. | |
| 2005/0021877 A1 | 1/2005 | Varpela et al. | |
| 2005/0039116 A1 | 2/2005 | Slack-Smith | |
| 2005/0091186 A1 | 4/2005 | Elish | |
| 2005/0226473 A1 | 10/2005 | Ramesh | |
| 2006/0026561 A1 | 2/2006 | Bauman et al. | |
| 2006/0031779 A1 | 2/2006 | Theurer et al. | |
| 2006/0053170 A1 | 3/2006 | Hill et al. | |
| 2006/0074730 A1 | 4/2006 | Shukla et al. | |
| 2006/0080616 A1 | 4/2006 | Vogel et al. | |
| 2006/0136513 A1 | 6/2006 | Ngo et al. | |
| 2006/0143075 A1 | 6/2006 | Carr et al. | |
| 2006/0265417 A1 | 11/2006 | Amato et al. | |
| 2006/0277460 A1 | 12/2006 | Forstall et al. | |
| 2006/0288046 A1 | 12/2006 | Gupta et al. | |
| 2007/0000999 A1 | 1/2007 | Kubo et al. | |
| 2007/0061752 A1 | 3/2007 | Cory | |
| 2007/0094248 A1 | 4/2007 | McVeigh et al. | |
| 2007/0113164 A1 | 5/2007 | Hansen et al. | |
| 2007/0245339 A1 | 10/2007 | Bauman et al. | |
| 2007/0284433 A1 | 12/2007 | Domenica et al. | |
| 2007/0299697 A1 | 12/2007 | Friedlander et al. | |
| 2008/0016155 A1 | 1/2008 | Khalatian | |
| 2008/0109714 A1 | 5/2008 | Kumar et al. | |
| 2008/0313132 A1 | 12/2008 | Hao et al. | |
| 2009/0006150 A1 | 1/2009 | Prigge et al. | |
| 2009/0007056 A1 | 1/2009 | Prigge et al. | |
| 2009/0089651 A1 | 4/2009 | Herberger et al. | |
| 2009/0106178 A1 | 4/2009 | Chu | |
| 2009/0112745 A1 | 4/2009 | Stefanescu | |
| 2009/0150868 A1 | 6/2009 | Chakra et al. | |
| 2009/0161147 A1 | 6/2009 | Klave | |
| 2009/0199106 A1 | 8/2009 | Jonsson et al. | |
| 2009/0271343 A1 | 10/2009 | Vaiciulis et al. | |
| 2010/0057622 A1 | 3/2010 | Faith et al. | |
| 2010/0070842 A1 | 3/2010 | Aymeloglu et al. | |
| 2010/0098318 A1 | 4/2010 | Anderson | |
| 2010/0199167 A1 | 8/2010 | Uematsu et al. | |
| 2010/0223260 A1 | 9/2010 | Wu | |
| 2011/0225482 A1 | 9/2011 | Chan et al. | |
| 2013/0151453 A1 | 6/2013 | Bhanot et al. | |
| 2013/0198624 A1 | 8/2013 | Aymeloglu et al. | |
| 2014/0129936 A1 | 5/2014 | Richards | |

FOREIGN PATENT DOCUMENTS

| | | |
|---|---|---|
| WO | WO 0125906 | 4/2001 |
| WO | WO2010030914 | 3/2010 |
| WO | WO2012119008 | 9/2012 |

OTHER PUBLICATIONS

Support.microsoft.com, "Frequently asked questions about Office Binder 97", 6 pages, printed from the internet Feb. 11, 2010, http://support.microsoft.com/kb/843147.

PCT/US2009/056707, International Search Report and Written Opinion, mailed Mar. 2, 2010, 11 pages.

Microsoft, "Using the Clipboard", http://msdn.microsoft.com/en-us/libary/ms649016.aspx, printed Jun. 8, 2009, 20 pages.

SnagIt, "SnagIt 8.1.0 Print Out 2, "Software Release dated Jun. 15, 2006, 3 pages.

Nitro, Trick: How to Capture a Screenshot as PDF, Annotate, Then Share it, http://blog.nitropdf.com/2008/03/04/trick-how-to-capture-a-screenshot-as-pdf-annotate-it-then-share/>dated Apr. 2, 2008, 5 pages.

Online Tech Tips, "Clip2Net—Share files and Screenshots easily", http://www.online-tech-tips.com/free-software-downloads/share-files-folders-screenshots/>, dated Apr. 2, 2008, 5 pages.

O'Reilly.com, http://oreilly.com/digitalmedia/2006/01/01/mac-os-x-screenshot-secrets.html >published Jan. 1, 2006, 10 pages.

"Remove a Published Document or Blog Post", Sharing and Collaborating on Blog Post.

Schroder, Stan, "15 Ways to Create Website Screenshots", <http://mashable.com/2007/0824/web-screenshots/, dated Aug. 24, 2007, 2 pages.

SnagIt, "SnagIt Online Help Guide", http://download.techsmith.com/snagit/docs/onlinehelp/enu/snagit_help.pdf, TechSmith Corp., Version 8.1, printed Feb. 7, 2007, p. 284.

Abbey, Kristen, "Review of Google Docs", dated May 1, 2007, 2 pages.

Bluttman et al., "Excel Formulas and Functions for Dummies", dated 2005, Wiley Publishing, Inc. pp. 280, 284-286.

Conner, Nancy, "Google Apps: The Missing Manual", dated May 1, 2008, p. 15.

Galliford, Miles, "SnagIt Versus Free Screen Capture Software: Critical Tools for Website Owners", http://www.subhub.com/articles/free-screen-capture-software>, dated Mar. 27, 2008, p. 11.

"GrabUp—What a Timesaver!", http://atlchris.com/191/grabup/>, dated Aug. 11, 2008, p. 3.

JetScreenshot.com, "Share Screenshots via Internet in Seconds", http://web.archive.org/web/20130807164204/http://www.jetscreenshot.com/, dated Aug. 7, 2013, 1 page.

Kwout, <http://web.archive.org/web/20080905132448/http://www.kwout.com/ dated Sep. 5, 2008, 2 pages.

Microsoft, "Registering an Application to a URI Scheme", http://msdn.microsoft.com/en-us/library/aa767914.aspx, printed Apr. 4, 2009, in 4 pages.

SnagIt, "SnagIt 8.1.0 Print Out", Software Release dated Jun. 15, 2006, p. 6.

Microsoft Windows, "Microsoft Windows Version 2002 Print Out 2", dated 2002, pp. 1-6.

Warren, Christina, "TUAW Faceoff: Screenshots apps on the firing line", http://www.tuaw.com/2008/05/05/tuaw-faceoff-screenshot-apps-on-the-firing-line/, dated May 5, 2008, p. 11.

"Frequently Asked Questions about Office Binder 97", http://web.archive.org/web2010112922/http://support.microsoft.com/kb/843147, printed Dec. 18, 2006, 5 pages.

* cited by examiner

SYSTEM AND METHOD FOR PARAMETERIZING DOCUMENTS FOR AUTOMATIC WORKFLOW GENERATION

BENEFIT CLAIM

This application claims the benefit under 35 U.S.C. 120 as a Continuation of application Ser. No. 13/218,238, filed Aug. 25, 2011, the entire contents of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present disclosure relates generally to data access and analysis and, more specifically, to a system and method for parameterizing documents for automatic workflow generation.

BACKGROUND

Financial data can typically be analyzed by users via applications that allow users to create analysis workflows. A workflow usually includes several components, each component generally specifying many parameters. In addition, a particular component can reference another component or a parameter within another component. For example, a first component of a workflow may include a subset of stocks to be analyzed, and a second component may apply a function to the subsets of stocks specified in the first component to generate a parameter within the second component.

After creating a particular workflow, the user often wants to modify one or more parameters of the components included in the workflow and, thereby, generate a new workflow. In existing applications, the user has to re-create the components with the modified parameters and then regenerate the new workflow. Such a solution is not only cumbersome, but is also very time-consuming as re-creating the components often takes a significant amount of time. In addition, such a solution is error prone as the user has to manually re-create the components. Lastly, because several copies of similar workflows are created, such as a solution is also not storage space efficient.

As the foregoing illustrates, what is needed in the art is a mechanism for generating new workflows from a current workflow.

SUMMARY OF THE INVENTION

One embodiment of the present invention sets forth a method for generating a new workflow for an application. The method includes generating a parameter tree related to a current workflow, wherein the parameter tree includes a different node corresponding to each parameter included in one or more documents associated with the current workflow, modifying a value associated with a first node included in the parameter tree based on an input, wherein the first node corresponds to a first parameter included in a first document associated with the current workflow, evaluating a second document associated with the current workflow based on the modified value associated with the first node, and generating the new workflow based on the evaluated second document.

A variable can be created that can be bound to different locations in the tree, where each location corresponds to a parameter in the document. Changing the value of the variable changes all the bound locations, propagating the values to the parameter in the respective document and redoes any synchronization needed for the workflow.

Advantageously, modifying a parameter in such a manner and propagating the modification across an entire workflow allows users to quickly generate new workflows from a current workflow without much manual editing. Such functionality enables users to analyze and evaluate different permutations of a particular workflow very efficiently.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF EXAMPLE EMBODIMENTS

Figure 1:
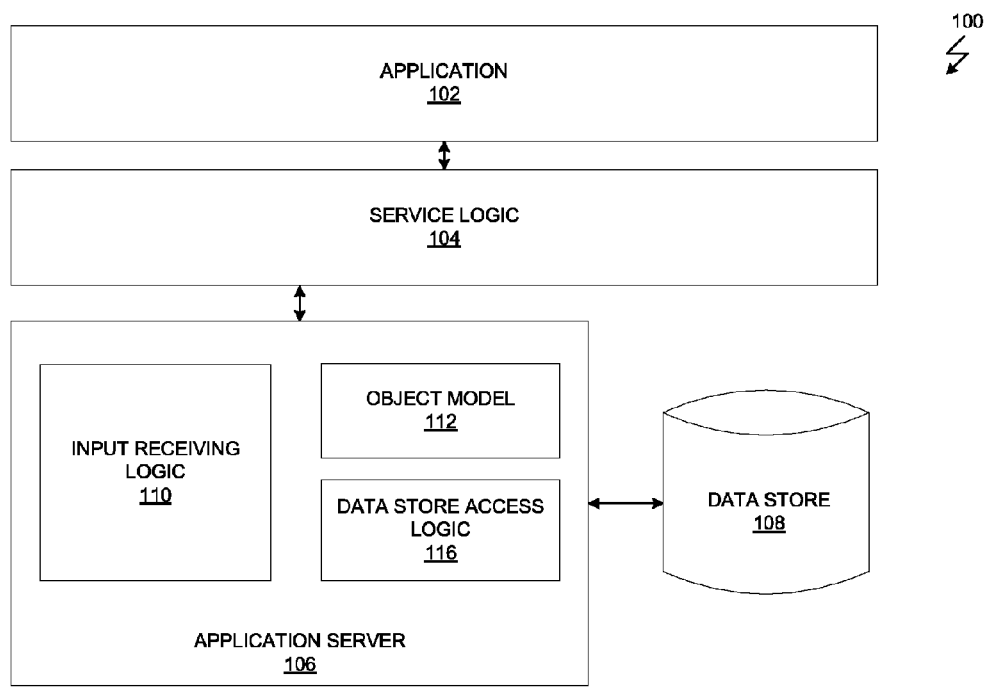
FIG. 1 illustrates a system for implementing one embodiment of the invention.

FIG. 1 illustrates a system 100 that enables a spreadsheet application to reference rich objects, according to one embodiment of the invention. As shown, the system 100 includes a application 102, service logic 104, an application server 106 and a data store 108.

The application 102 is a software program that allows a user to create, analyze and interact with workflows having one or more documents. A document is typically composed of several data objects, each having a particular type and function. The data objects that could make up a document are described in greater detail below. In addition, specific functionality of the application 102 with respect to creating workflows and automatically generating new workflows is also described below in conjunction with FIG. 2.

The service logic 104 is an infrastructure layer that, among other things, allows the application 102 to communicate with the application server 106. In one embodiment, the service logic 104 includes a messaging service (not shown) that allows the application 102 and the application server 106 to communicate asynchronously via messages.

The application server 106 includes logical elements such as input receiving logic 110, an object model 112 and data store access logic 116. The application server 106 may be implemented as a special-purpose computer system having the logical elements shown in FIG. 1. In one embodiment, the logical elements comprise program instructions stored on one or more machine-readable storage media. Alternatively, the logical elements may be implemented in hardware, firmware, or a combination thereof.

The input receiving logic 110 receives inputs from different applications executing within the system 100, such as the application 102, via the service logic 104. Inputs include, but are not limited to, processing requests, data access/storage requests and expression evaluation requests. The input receiving logic 110 transmits requests received from the different applications to logical elements within the application server 106 that are configured to process those requests.

The object model 112 is a model that specifies a universe of data objects, relationships between the data objects, higher-order data objects generated based on one or more zero-order data objects in the universe, higher-order data objects generated based on other higher-order data objects, and auxiliary entities related to the universe of data objects. The data objects may be created by users via data object creation mechanisms exposed in different applications, such as the application 102. In one embodiment, the object model 112 includes only references to the data objects and data related to those data objects is stored within the data store 108. Below are some examples of different data objects that are included in the object model 112. Persons skilled in the art would understand that any other data objects can be included in the object model 112.

Examples of Zero-Order Data Objects

Instruments: An instrument is a data object that represents any market traded entity or product of interest, such as a stock (equity), bond, currency, or fund.

Metrics: A metric is a transformation (or function) that receives one type of data (e.g., an object such as an instrument) and returns another type (e.g., another object such as a time series). A metric may perform any form of specified processing, specified computation, related operations such as database queries, network communications and data storing. For example, a metric may receive a particular instrument as input and return a time series of the particular instrument's volume. A metric may also receive one time series for an instrument and return the value of the instrument on a given day. A metric may optionally receive parameters at runtime that influence the execution of logic implemented in the metric. An example of a parameter that can be inputted into a metric to influence the execution of a metric may be a number of days to show a moving average price for MSFT where the metric calculates the moving average price.

Objects that are of a higher order than a zero order can be built using metrics. The input objects and the output objects can be zero-order or higher-order in any combination. The data changes over time. Therefore, if a metric is evaluated at two different times, it may produce different outputs. Alternatively, output objects from one or more of these metrics may be pre-computed/evaluated and stored/cached beforehand. In some embodiments, parameters may be provided to a metric to specify whether a cached object of a metric should be used as input, or whether the output of a metric should be cached or stored.

Time Series: A time series is a programmatic object that represents time-dependent information in any of several forms, including a series of discrete dates or a sequence of time-related values. Where an object model contains a large amount of time-dependent information, many time series may be created in the process of evaluating objects in the object model. For example, an instrument may have a trading history that indicates its values over a period of time. From this trading history (e.g., raw trading data), one or more time series may be created to represent time-dependent information, in any desired resolution (for example, in a time scale of years, months, weeks, days, hours, minutes, seconds).

In some embodiments, a time series may comprise a set of numeric values and a separate set of time values, wherein each numeric value has a corresponding time value in the set of time values. Each such numeric value represents a value of a certain entity at each corresponding time value in the set of time values. For example, a time series may be used to represent market values of an instrument. The above-mentioned "value of a certain entity" may be a particular market value at the closing of a trading day. In this example, the time series may comprise a set of long or double values, each of which represents a market value at the closing of a corresponding day as indicated by a time value in a separate set of time values. The time series further comprises the separate set of time values representing the closings of all corresponding days, for which market values of the instruments are included in the set of long or double values.

A time series may also be used to represent values of an entity for time values that meet certain criteria. For example, a time series may be used to represent market values for an instrument when the instrument is traded to higher prices, when the instrument is traded to lower prices, when the volatility of the instrument exceeds a certain limit, when the volatility of the instrument stays below a certain limit, or a derivative of other time series. Furthermore, the values of an entity are not limited to market values of an instrument. For example, the values of an entity, as represented by a time series, may comprise analytical values of historical volatility of two instruments.

In some embodiments, a time series associated with an instrument may be accessed by an expression containing an identifier (e.g., the identifier "GOOG" to indicate the equity instrument for Google, Inc.) for another object such as an instrument and a token (e.g., a textual name such as "HVOL" representing historical volatility of an instrument) for a type of transformation. In the present example where the time series is accessed by the expression "GOOG.HVOL", the metric identified by the token (e.g., "HVOL") receives the identifier for the instrument (e.g., "GOOG") as input and transforms raw trading data of the instrument (i.e., "GOOG") into a time series as an output object. This time series, for example, may represent time-dependent information of volatility of the instrument "GOOG" in all recorded trading days.

A time series can not only represent time-dependent information for zero-order objects such as instruments, but may also represent time-dependent information for any higher-order objects in the object model.

In some embodiments, a time series may be used to represent time-dependent information that is not related to another object. For example, a set of time values from a calendar, e.g., all week days, all work days, all Mondays, or the second days of months, may be transformed by a metric into a time series. Such a time series may be viewed as an object per se as it is independent of another object such as an instrument. In some embodiments, the time series may be accessed within a global scope, by any other objects, without naming any other object such as an instrument. In some embodiments, a time series may comprise a set of time values (e.g., all Mondays) without including a separate set of numeric values representing values of an entity that may be associated with another object such as an instrument.

Example Higher-Order Data Objects

Date Set: A date set comprises a set of time values that satisfy one or more selection criteria. As used herein, the term "time value" may include date and/or time of day information at various resolutions, for example, from multiple years to sub-seconds. For example, a date set may be all trading days when the "GOOG" stock trades up. A date set may also have an explicit start time value for the set, for example, Jan. 1, 2006; thus, the date set excludes all time values that are before the explicit start time value. Similarly, a date set may also have an explicit end time value; thus, the date set excludes all time values that are after the explicit end time value.

A date set may also take an implicit start time value, where an explicit start time value is not specified. For example, a date set that comprises all days when the "GOOG" stock trades up may have an implicit start time value when the "GOOG" stock was first publicly traded. Similarly, a date set may also take an implicit end time value, where an explicit end time value is not specified. For example, a date set that comprises all days when the "ENE" stock was available for trades may have an implicit end time value when the "ENE" stock was terminated from public trading from the New York Stock Exchange.

One of several object creation mechanisms may be used to create higher-order objects such as date sets. One object creation mechanism is a metric. This metric may take a first input that specifies a time series. This time series is generally a set of date/value pairs. The date set metric also may take a second input that specifies one or more criteria. For example, the one or more criteria as specified in the second input may specify a range. The resulting date set will then contain all the dates as indicated by the time series that are within the specified range.

Another object creation mechanism to create a higher-order object such as a date set is to directly use a programming language such as JAVA. The user may supply programming language code to the system 100, which may be compiled, interpreted or otherwise executed by the system 100 to create a date set. Extension mechanisms such as Java reflection may be used to add code segments or objects to the system so that the object creation mechanisms can be dynamically extended.

Yet another object creation mechanism to create a higher-order object such as a date set is to interact with a user interface. For example, tools or widgets may be provided in or through a graphical user interface and may interact with the user for the purpose of creating a date set.

In various embodiments, these and other object creation mechanisms, or a combination thereof, may be used to create various higher-order objects.

Index: An index indicates a collective value of one or more instruments as a function of time over a set of time values. A collective value is any type of aggregate value of the one or more instruments. The collective value may be of a market value type such as a total monetary value of the one or more instruments traded at public exchanges, or of an analytical value type such as a numeric value indicating volatility of the trading price for the one or more instruments, as a function of time over the set of time values.

For the purpose of illustration only, the one or more instruments included in the index may comprise the "GOOG", "YHOO", and "MSFT" stocks. Hence, the index may be an aggregate market value of these stocks, as a function of time over all trading days since Jan. 1, 2011. A market value is an aggregation of values of all assets included in the portfolio at a corresponding time value in the set of time values. The market value may be measured (e.g., denominated) in a reference currency such as the U.S. dollar. For example, a value of an asset such as an instrument may be a trading price of that instrument at the closing of a particular trading day. A value of the reference currency may be its trading value as denominated in the reference currency. A value of a currency that is not the reference currency may also be measured in the reference currency through an exchange rate.

An index may have a start time value, for example, Jan. 1, 2011; thus, the index does not track the collective value before the start time value. Similarly, an index may also have an end time value; thus, the index does not track the collective value after the end time value. The start time value and/or the end time value may be explicit or implicit.

To create an index, any of the object creation mechanisms may be used. An object creation mechanism may take a first input that specifies one or more time series for the one or more instruments. For example, these time series as specified in the first input may represent trading prices for the "GOOG", "YHOO", and "MSFT" stocks on all trading days when the stocks are publicly traded. The object creation mechanism also may take a second input that specifies a date set. In some embodiments, the date set as specified in the second input may specify a set of days for which a collective value of the one or more instruments should be tracked. For example, the date set may comprise a set of last five trading days of each quarter since Jan. 1, 2011. The object creation mechanism may comprise logic to compute the collective value of the one or more instruments as specified in the first input over the set of time values as specified in the second input. The object creation mechanism may create and output an index in the form of a new time series. Each numeric value in the set of longs or doubles indicates the collective value of the "GOOG", "YHOO", and "MSFT" stocks at a time value (e.g., a day) in the set of last five trading days of each quarter since Jan. 1, 2011.

The user may provide a token in the form of a string to name the index so that the definition or computed value of the index can be subsequently referenced as a named object in combination with other objects. In an embodiment, any of all the entities that are involved in specifying, creating and outputting a new index may be stored or cached in a machine-readable storage medium. In addition, the definition of new index may also be stored or cached in such a medium.

Instrument Group: An instrument group comprises one or more instruments selected from a universe of instruments using a filter chain that is created from zero or more set operations and one or more filter links. For example, an instrument group may comprise all the stocks in the S&P Index ("SPX") that are in the technology sector. Another example of instrument group may be all the stocks in the financial sector of the S&P Index that have low PE ratios.

To create an instrument group, an object creation mechanism may be used. This mechanism may take a first input that specifies the zero or more set operations. For example, a set operation of "intersection" may be specified as the first input. The object creation mechanism also may take a second input that specifies the one or more filter links. For the purpose of illustration only, such a filter link may be a criterion that any selected stock must belong to the bucket of lowest 10% among an input set of instruments. In some embodiments, graphical user interface 200 of client 120 may be used to create an instrument group. A filter view 206 may be used to represents an input set of instruments to which a filter link may be applied. In this example, all stocks in the financial sector of the S&P Index are used as an input set of instruments. These stocks are represented in an percentile filter diagram. This percentile filter diagram comprises n (a positively integer such as ten) buckets, each bucket comprising substantially a same number of instruments. Each bucket represents a particular range of 10% PE ratios. Thus, if a stock is in the top 10% among all the stocks in terms of PE ratios, the stock will be included in the bucket between 90% and 100%. Similarly, if a stock is in the bottom 10% among all the stocks in terms of PE ratios, the stock will be included in the bucket between 0% and 10%.

The object creation mechanism may comprise logic to create a filter chain by evaluating each filter link in the filter chain, combining the filter chains based on the set operation specified, and generates the instrument group that comprises the one or more instruments. In the present example, where the filter link is created using an percentile filter diagram, the object creation mechanism may create and output an instrument group that comprises a set of instruments that are in the bottom 10% of PE ratios.

The user may provide a token in the form of a string to name the instrument group. For example, this instrument group may be called "low PE SPX Financials." In some embodiments, a text input box may be provided in graphical user interface to accept input of the string. Subsequently, this named instrument group may be used in combination with other objects by a reference to the token.

In an embodiment, any of all the entities that are involved in specifying, creating and outputting a new instrument group may be stored or cached in a machine-readable storage medium. In addition, the new instrument group may also be stored or cached in such a medium.

Portfolio: A portfolio indicates a market value of included assets as a function of time over a set of time values. A portfolio may comprise a start time value from which the market value of the portfolio is to be tracked. A portfolio may optionally comprise an end time value after which the market value of the portfolio is no longer tracked. The set of assets included in the portfolio at any given time value may comprise a variable number of instruments. The set of assets may optionally include a certain amount in various currencies (including currency equivalents).

To create a portfolio, an object creation mechanism may be used. This mechanism may take a first input that specifies zero or more time series for the zero or more instruments. For example, these time series as specified in the first input may represent trading prices for the "GOOG", "YHOO", and "MSFT" stocks on all trading days when the stocks are publicly traded. In some embodiments, the object creation mechanism may use weight factors to determine how much of each of these instruments is to be hold in the portfolio at each time value of a time period starting from the start time value. The object creation mechanism also takes a second input that specifies a date set. In some embodiments, the date set as specified in the second input specifies a set of time values (e.g., the preceding time period) for which a market value of the portfolio should be computed. For example, the date set may comprise a set of all trading days since Jan. 1, 2011. The object creation mechanism may further take a third input that specifies the one or more trades over the set of time values as specified in the second input. Each trade may specify an instrument, a buy-or-sell indication, a time of trading, and a quantity. The object creation mechanism may comprise logic to execute, or to simulate execution of, trades as specified in the third input and to compute the market value of the portfolio over the set of time values as specified in the second input, thereby giving rise to a new portfolio object. Any other metric may be applied to the new portfolio object to extract information. In addition, the portfolio object may be used to create another higher-order object. In the present example, the associated set of time values to which the long or double values are mapped is the set of time values specified in the second input. For example, each numeric value in the set of longs or doubles indicates a collective market value of all assets in the portfolio at a time value in the set of all trading days since Jan. 1, 2011.

The user may provide a token in the form of a string to name the portfolio so that a subsequent reference can be made to the token in an expression that involves other objects.

In an embodiment, any of all the entities that are involved in specifying, creating and outputting a new portfolio may be stored or cached in a machine-readable storage medium. In addition, the new portfolio may also be stored or cached in such a medium.

Strategy: A strategy may be used to generate a net profit in a time period. A net profit in a time period is a net gain or loss at the end of the time period. Here, the net profit may be determined by a number of trades executed within the time period and market conditions. A block of strategy code may be used to generate the trades that are to be executed in connection with the strategy. In some embodiments, the net profit and the trades may be hypothetical and generated for the purpose of studying, validating or invalidating a particular trading strategy.

The time period may be represented by a date set that comprises a starting time value corresponding to the beginning of the time period and optionally an end time value corresponding to the end of the time period.

In some embodiments, a strategy comprises an initial collection of assets at the beginning of the time period. In a particular embodiment, this initial collection of assets may comprise only a starting net asset value in a reference currency such as the U.S. dollar.

To create a strategy, an object creation mechanism may be used. This object creation mechanism may take a first input that specifies a particular date set. Comprising a start time value and optionally an end time value as previously described, the particular date set represents a time period where trades may be generated and executed. For example, the date set may be all trading days from Jan. 1, 2006 to now. Alternatively, the date set may be all trading days when the "GOOG" stock trades up.

The object creation mechanism may take a second input that specifies a statement block, which when executed generates one or more trades. Each trade may specify an instrument, a-buy-or-sell indication, a time of trading, and a quantity. The object creation mechanism may comprise logic to execute, or to simulate execution of, the statement block and the trades as generated by the statement block and to compute the market value of the strategy over the set of time values as specified in the first input, thereby creating a new strategy object. Any other metric may be applied to the new strategy object to extract information. In addition, the strategy object may be used to create another higher-order object. Furthermore, the object creation mechanism may create and output a net profit at the end of the time period. In the present example, the object creation mechanism may create and output a net profit of 72,277.21 in the reference currency of US dollar.

The user may provide a token in the form of a string to name the strategy. For example, the strategy may be named as "VLD during rising rates. Subsequently, this strategy may be used to create other higher-order objects.

In an embodiment, any of all the entities that are involved in specifying, creating and outputting a new strategy may be stored or cached in a machine-readable storage medium. In addition, the new strategy may also be stored or cached in such a medium.

Regression: A regression may be used to perform predictions, inferences and hypothesis analyses between independent time series and a dependent time series in the object model.

To create a regression, an object creation mechanism may be used. This object creation mechanism may take a first input that specifies one or more first time series representing independent variables in a regression analysis. For example, the one or more first time series may be ones that are associated with objects like "Exxon Mobil Corp", "WTI CRUDE FUTURE (1st month generic)", and "S&P 500 INDEX" in the object model. The object creation mechanism also may take a second input that specifies a second time series representing a dependent variable in the regression analysis. The object creation mechanism may comprise logic to perform the regression analysis that transforms the one or more first time series into a predicted time series and compares the predicted time series with the second time series, thereby creating a new regression object. This new regression object may be used in part by another object creation mechanism to create other higher-order objects.

The user may provide a token in the form of a string to name the regression. Subsequently, this regression may be used in combination with other objects through a reference to its token.

In an embodiment, any of all the entities that are involved in specifying, creating and outputting a new regression may be stored or cached in a machine-readable storage medium. In addition, the new regression may also be stored or cached in such a medium.

A user may define an arbitrarily complex object that is built on top of other objects. For example, liquidity and risk models may be built as a multi-level object on top of an instrument group, a portfolio, several indexes, a date set, etc. Similarly, an index may be built on top of other higher-order objects. In some embodiments, a higher-order object may be represented as a tree. The leaf nodes of the tree are zero-order objects such as instruments. The tree may additionally and/or optionally contain non-leaf nodes. The non-leaf nodes are higher-order objects. In other words, a higher-order object may be built from building blocks. These building blocks may be zero-order or higher-order objects. For example, when an index is built from an instrument group, the instrument group also may be built from a combination of other higher-order and zero-order objects.

Any of several object creation mechanisms may be selected by a user for the purpose of creating a higher-order object. Definitions for the higher-order objects may be generated by the object creation mechanism and saved in the system. A definition may be defined and evaluated at two different times. The results of evaluation of a definition may change as underlying data changes. These results may be saved in cache or in permanent storage.

In accordance with an embodiment of the present invention, an input mechanism is provided for a user to enter expressions to the application server 106 for the purpose creating, modifying, deleting, evaluating, or saving various objects and components in the object model. Here, the term "input mechanism" includes either a command line interaction mechanism or a graphic-user-interface based interaction mechanism, or a combination of the preceding two. In other embodiments, an input mechanism is not used and objects may be specified programmatically or at runtime using other mechanisms.

An expression may comprise one or more tokens separated by delimiter characters such as a period, parentheses, a comma, quotation marks, etc. Each token may refer to an economic index, an instrument, a metric, an input object, an output object, a parameter, a time series, a higher-order-object, or any higher-order object in the object model. An expression may be evaluated with a certain order. For example, in a particular embodiment, the expression may be evaluated according to a precedence ordering among operators. Additionally and/or optionally, certain optimization logic may be used to determine whether any tokens in an expression can be evaluated in parallel.

In an embodiment that uses a modeling language, a user may type an expression "(HVOL( )+IVOL( ))/2" to define a new custom metric. For the purpose of illustration only, "HVOL( )" and "IVOL( )" may be two tokens for two metrics. Tokens for other constructs may also be used. The user may give a new token "avgvol( )" for this new metric. Subsequently, the token "avgvol( )" for the new metric may be displayed as a selectable item in a dialog pane. This new metric may be used together with an instrument such as "GOOG" to cause a new time series to be created and displayed. This new time series is produced by averaging values from two time series as specified by "HVOL( )" and "IVOL( )."

The application server 106 may immediately make available this new type of object (e.g., a new function "avgvol( )") to all users of the system. The users simply specify the token associated with the new type of object in subsequent expressions. The time series representing "HVOL( )" and "IVOL( )" can be displayed in a content pane, along with a new time series as specified by the new token (i.e., "avgvol( )").

In this manner, new types of objects and new types of expressions can be continuously added to the object model 112, which causes the object model 112 to evolve over the time. For example, a user may continuously define new hypotheses as new object types or as new instances of existing object types and timely test the new hypotheses in a rapidly changing market. Evaluations of some of these hypotheses may be saved or cached along with the definitions for the hypotheses. These hypotheses can also be recalled, re-studied, and reused by way of suitable tokens at a later time.

In an embodiment, application server 106 comprises data store access logic 116. Data store access logic 116 may comprise a set of program instructions which, when executed by one or more processors, are operable to access and retrieve data from data store 108. For example, data store access logic 116 may be a database client or an Open Database Connectivity (ODBC) client that supports calls to a database server that manages data store 108. Data store 108 may be any type of structured storage for storing data including, but not limited to, relational or object-oriented databases, data warehouses, directories, data files, and any other structured data storage.

Figure 2:
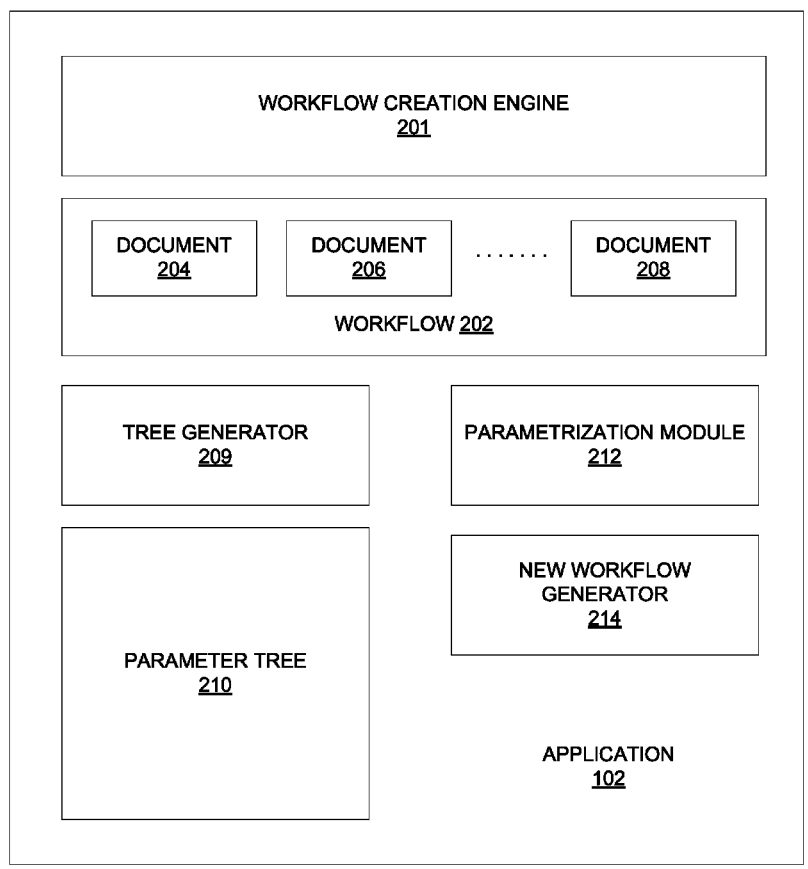
FIG. 2 illustrates a more detailed view of the application of FIG. 1, according to one embodiment of the invention.

FIG. 2 illustrates a more detailed view of the application 102 of FIG. 1, according to one embodiment of the invention. As shown, the application 102 includes a workflow creation engine 201, a workflow 202, a tree generator 209, a parameter tree 210, a parametrization module 212 and a new workflow generator 214.

The workflow creation engine 201 is a software engine that allows a user of the application 102 to create workflows, such as the workflow 202. Each workflow has one or more documents, such as documents 204, 206 and 208 in the workflow 202, where one of the documents is designated as the "top-level" document. Further, each document in the workflow 202 is composed of one or more data objects, such as the ones described above with respect to the object model 112. Data objects that are used to create a document are referred to herein as "parameters." Further a particular document, such as document 208, can reference another document, such as document 206. A pair of documents, where one document references another document, is referred to herein as "linked documents." In one embodiment, each document has a particular type, and each type of document is generated in a separate sub-engine (not shown) of the workflow creation engine 201.

The tree generator 209 is a software engine that analyzes documents within a workflow to generate a parameter tree, such as parameter tree 210 associated with the workflow 202. To generate the parameter tree, the tree generator 209 traverses through each document included in the workflow 202 to identify the parameters associated with that document. In one embodiment, each document type has a corresponding tree provider software module (not shown) that the tree generator 209 calls when identifying parameters associated with a particular document of that type. The value of each parameter of a document included in the workflow 202 is stored in the parameter tree 210.

Figure 3:
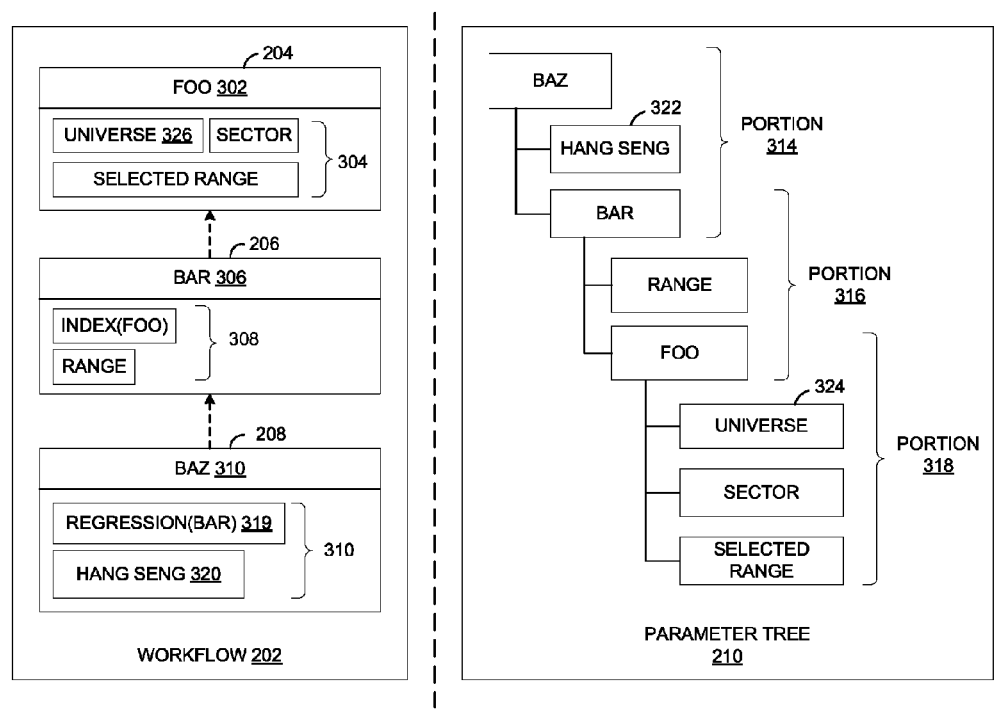
FIG. 3 is a conceptual illustration of an exemplary workflow and a parameter tree corresponding to the workflow, according to one embodiment of the invention.

An example of a parameter tree 210 generated by the tree generator 209 when analyzing a particular workflow 202 is illustrated in FIG. 3. As shown, the workflow 202 includes document 204 having an identifier "foo" 302, document 206 having an identifier "bar" 306 and document 208 having an identifier "baz" 310. As also shown, the document 204 includes parameters 304, document 206 includes parameters 308 and, similarly, the document 208 includes parameters 312. Further, document 206 references document 204 and is, therefore, linked to document 204. Similarly, document 208 references document 206 and is, therefore, linked to document 206.

In this example, to generate the parameter tree 210 associated with the workflow 202, the tree generator 209 traverses through each of the documents included in the workflow 202 to generate a corresponding portion of the parameter tree. As shown, portion 314 of the tree corresponds to document 208, portion 316 corresponds to document 206 and portion 318 corresponds to document 204. In operation, the tree generator 209 first traverses through the document 208, which, in the current example, is the top-level document of the workflow 202. The tree generator 209 identifies each parameter of the parameters 312 included in the document 208 and creates a node for each of the parameters in the parameter tree 210. For example, as shown, the node 322 in the parameter tree 210 corresponds to the parameter 320 in the document 208. When the tree generator 209 determines that an identified parameter, such as the parameter 319, is a reference to another document, the tree generator 209 traverses through the referenced document to generate the corresponding portion of the tree. In addition, each node in the parameter tree 210 is associated with a back-end data object that holds the value of that particular node. The value of the node may be modified via the back-end data object.

Referring back to FIG. 2 now, the parametrization module 212 is a software engine that allows a user to modify a value of a particular node in the parameter tree 210, where the new value is stored in the back-end data object. In response to a modified value, the parametrization module 212 propagates the value to the document that includes the parameter corresponding to the node. For example, via a user input, the user may modify the value of the node 322 within the parameter tree 210. In response, the parametrization module 212 propagates the new value of the node 322 to the parameter 320 included in the document 208. As another example, via a user input, the user may modify the value of the node 324 within the parameter tree 210. In response the parametrization module 212 propagates the new value of the node 324 to the parameter 326 included in the document 204.

In one embodiment, more than one document specifies a parameter related to the parameter corresponding to the modified node. In such an embodiment, the parametrization module 212 propagates the value of the modified node to the related parameters in different documents. In another embodiment, a single variable can be bound to different parameters included in multiple documents. In such an embodiment, a modification of the single variable results in each of the different parameters that are bound to the single variable being modified.

In a scenario where a parameter included in a lower level document that is linked to a higher level document is modified, the new workflow generator 214 re-evaluates all higher level documents linked to the lower level document and generates a new workflow. In one embodiment, the new workflow includes a version of each document in the original workflow, optionally modified based on the modified parameter. In another embodiment, the new workflow only includes the highest level document in the original workflow, optionally modified based on the modified parameter. In such an embodiment, the modifications made to any lower level documents are persisted such that the new workflow can be recreated from the original workflow whenever needed.

Continuing the example above, when the new value of the node 324 is propagated to the parameter 326 included in the document 204, the new workflow generator 214 re-evaluates the document 204 and the document 206 linked to the re-evaluated document 204. Since the document 206 is linked to the document 208, the new workflow generator 214 then re-evaluates the document 208, thereby creating a new workflow.

Figure 4:
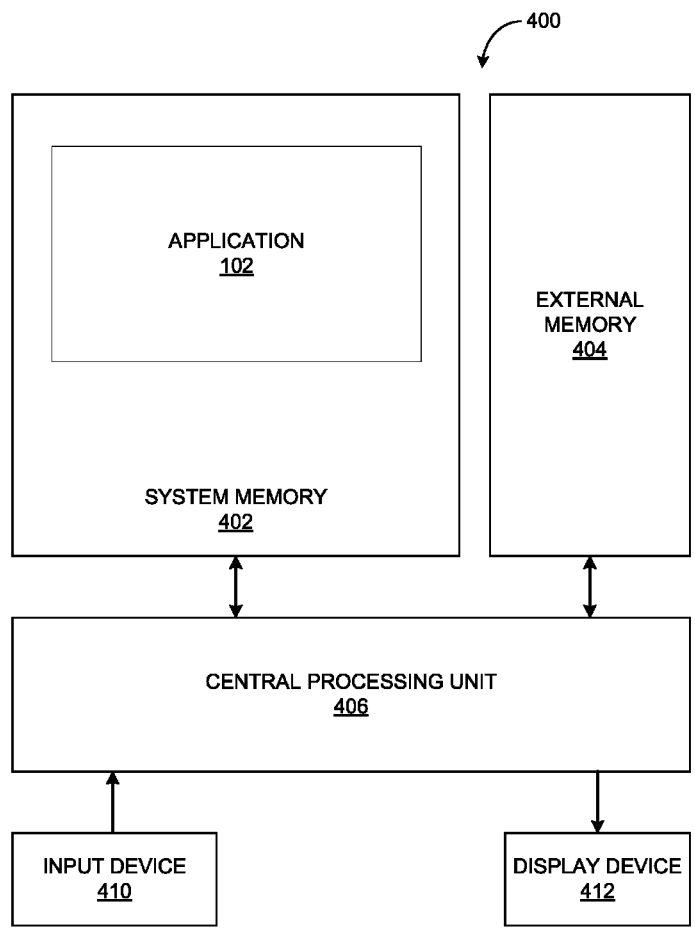
FIG. 4 is an exemplary system within which the application of FIG. 1 could execute, according to one embodiment of the invention.

FIG. 4 is an exemplary system within which the application 102 of FIG. 1 could execute, according to one embodiment of the invention. As shown, the system 400 includes a system memory 402, an external memory 404, a central processing unit (CPU) 406, an input device 410 and an display device 412.

The system memory 402 includes the application 102 previously described herein. The system memory 402 is a memory space, usually a random access memory (RAM), that temporarily stores software programs running within the system 400 at any given time. The CPU 406 executes a sequence of stored instructions associated with and/or transmitted from the various elements in the computer system 400. The external memory 404 is a storage device, e.g. a hard disk, for storing data associated with the video conferencing application 112. The input device 410 is an end-user controlled input device, e.g. a mouse or keyboard, that allows a user to manipulate various aspects of the application 102 including the UI logic 202. The display device 412 may be a cathode-ray tube (CRT), a liquid crystal display (LCD) or any other type of display device.

Figure 5A:
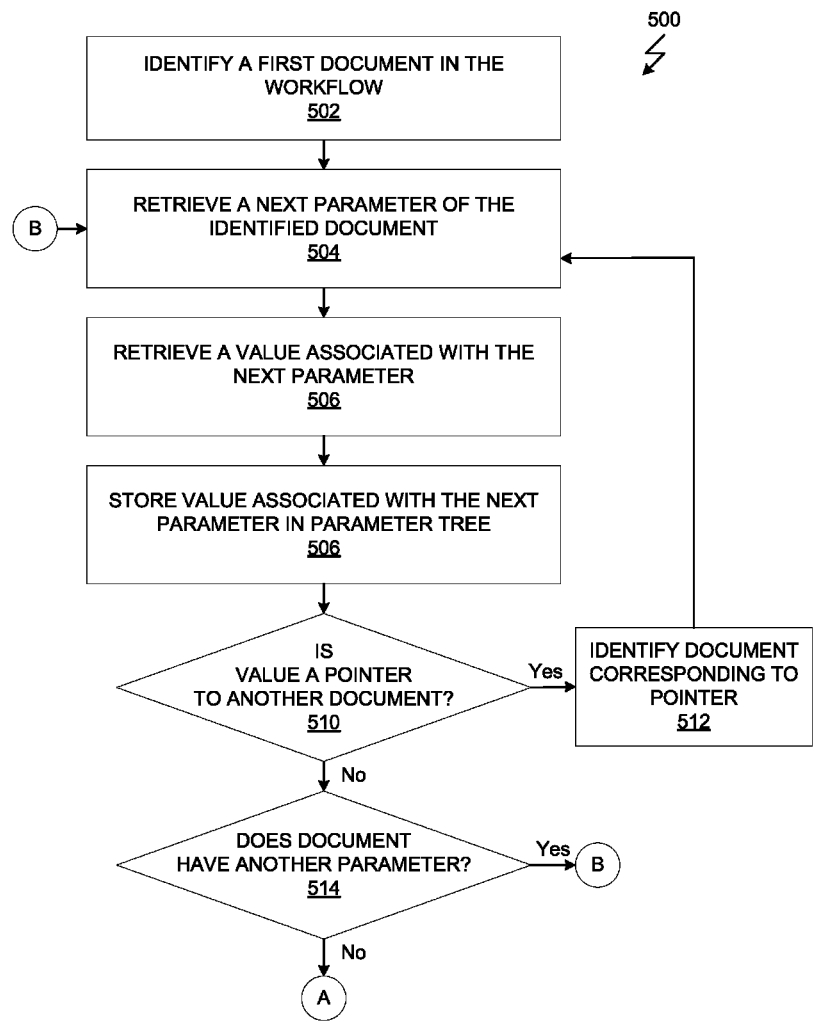
FIGS. 5A and 5B set forth a flow diagram of method steps for generating a parameter tree based on one or more documents included in a workflow, according to one embodiment of the invention.
Figure 5B:
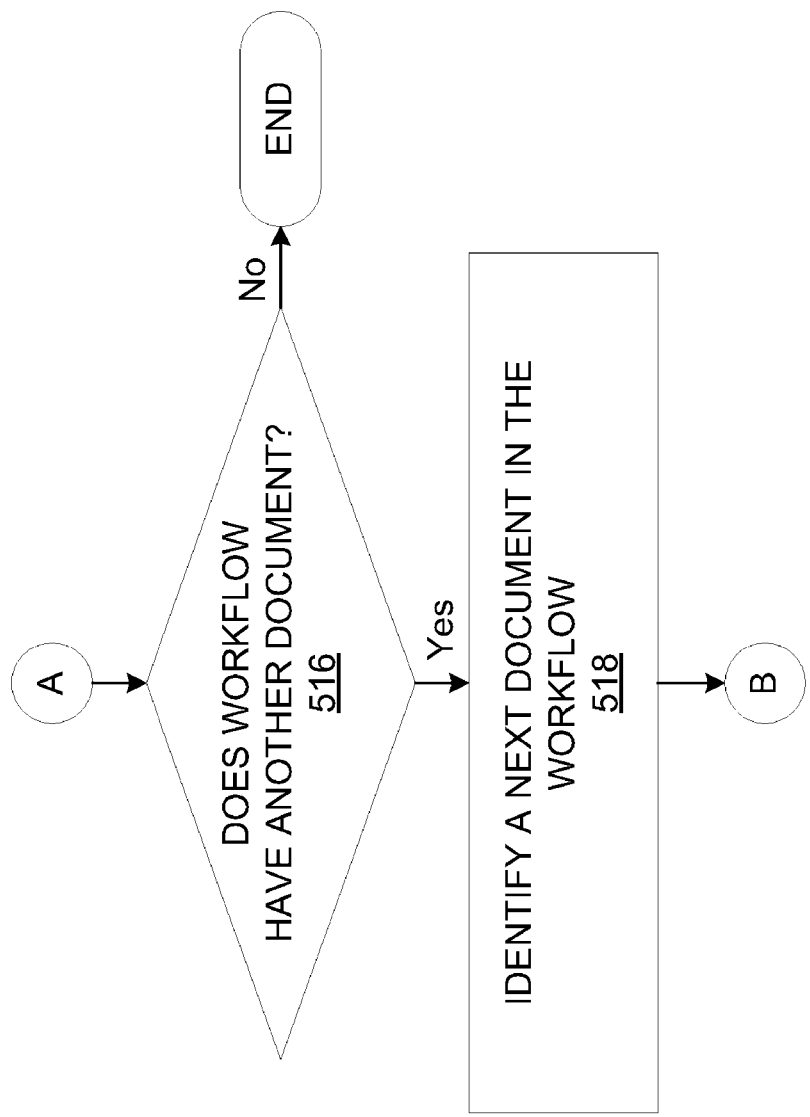

FIGS. 5A and 5B set forth a flow diagram of method steps for generating a parameter tree based on one or more documents included in a workflow, according to one embodiment of the invention. Although the method steps are described in conjunction with the system for FIG. 1-4, persons skilled in the art will understand that any system configured to perform the method steps, in any order, is within the scope of the invention.

The method 500 begins at step 502, where the tree generator 209 identifies a first document, such as the document 208 in a workflow, such as the workflow 202. At step 504, the tree generator 209 retrieves a next parameter (in the case of the first iteration, the next parameter would be the first parameter, such as the parameter 320) included in the identified document. At step 506, the tree generator 209 retrieves a value associated with the parameter, such as the value "Hang Seng associated with parameter 320, from the document that includes the parameter. At step 508, the tree generator 209 stores the retrieved value in a node, such as node 322, corresponding to the parameter in the parameter tree associated with the workflow.

At step 510, the tree generator 209 determines whether the value associated with the parameter is a pointer to another document in the workflow. If, at step 510, the value associated with the parameter is not a pointer to another document (which is true for parameter 320), the method proceeds to step 514, where the tree generator 209 determines whether the document includes another parameter. If the document includes another parameter, then the method 500 proceeds to step 504, previously described herein.

If the document does not include another parameter, the method 500 proceeds to step 516, where the tree generator determines whether the workflow has another document. If the workflow does have another document, then the method 500 proceeds to step 518, where the tree generator 209 identifies a next document in the workflow. The method 500 then proceeds back to step 504, previously described herein, where a next parameter in the document identified at step 518 is retrieved. However, if the workflow does not have another document, then the method 500 ends.

Referring back to step 510 now, if the value associated with the parameter is a pointer to another document (which is true for parameter 319), then the method 500 proceeds to step 512, where the tree generator 209 identifies the document corresponding to the pointer. The method 500 then returns to the step 504 previously described herein, where a next parameter in the document identified at step 512 is retrieved.

Figure 6:
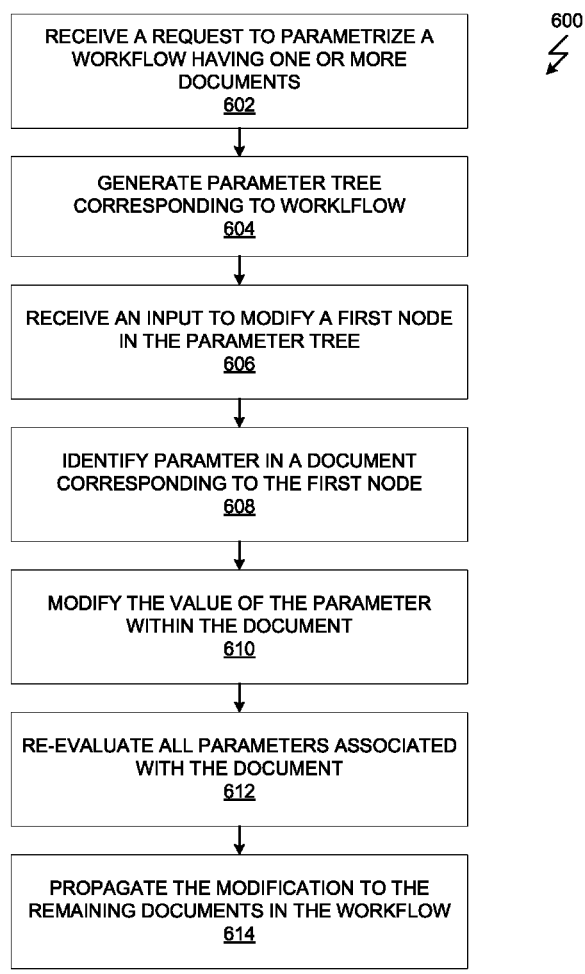
FIG. 6 is a flow diagram of method steps for automatically generating a new workflow based on the modification of a parameter associated with a current workflow.

FIG. 6 is a flow diagram of method steps for automatically generating a new workflow based on the modification of a parameter associated with a current workflow. Although the method steps are described in conjunction with the system for FIG. 1-4, persons skilled in the art will understand that any system configured to perform the method steps, in any order, is within the scope of the invention.

The method 600 begins at step 602, where the application 102 receives a request from a user to parametrize a current workflow that was generated within the application 102. The current workflow has one or more documents, each document including at least one parameter. In response, at step 604, the tree generator 209 generates a parameter tree associated with the current workflow via the method steps described in FIG. 5.

At step 606, the parametrization module 212 receives an input from a user to modify a variable linked to a first node in the parameter tree, where the first node corresponds to a particular parameter in a document included in the current workflow. At step 608, the parametrization module 212 identifies the particular parameter in the document that corresponds to the first node. At step 610, the parametrization module 212 modifies the value of the parameter based on the value received via the input at step 606.

At step 612, the new workflow generator 214 re-evaluates each parameter in the document based on the modified value. At step 614, the new workflow generator 214 propagates the modification to any remaining documents that are linked of the document via the modified parameter to generate a new workflow. In addition, the new workflow generator propagates the modification to any parameters in the various documents included in the workflow that the match the parameter that was modified.

In addition, the variable modified by the user at step 606 may be linked to multiple parameters across different documents included in the current workflow. In such a scenario, the variable modification causes the modification of each of the linked parameters and the corresponding re-evaluation of all the documents that include a linked parameter.

Advantageously, modifying a parameter in such a manner and propagating the modification across an entire workflow allows users to quickly generate new workflows from a current workflow without much manual editing. Such functionality enables users to analyze and evaluate different permutations of a particular workflow very efficiently.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Another embodiment of the invention may be implemented as a program product deployed for use over a network. In such an embodiment, the program product may be accessed via a web browser.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for generating a new workflow for an application, the method comprising:
    generating a parameter tree related to a current workflow, wherein the parameter tree includes a different node corresponding to each parameter included in a document of a plurality of documents associated with the current workflow, wherein each of the plurality of documents comprises one or more functions;
    modifying a first value associated with a first node included in the parameter tree based on an input, wherein the first node corresponds to a first parameter included in a first document associated with the current workflow;
    wherein a second node included in the parameter tree corresponds to a second parameter included in a second document in the current workflow, and wherein the first node is associated with the second node;
    generating the new workflow based on evaluating the second document by performing the one or more functions in the second document based on the first value associated with the first node to produce an evaluated second document in response to determining the second node is associated with the first node in the parameter tree;
    wherein the method is performed using one or more computers.

2. The method of claim 1 comprising modifying a second value associated with the first parameter to equal the first value associated with the first node.

3. The method of claim 2, wherein evaluating the second document comprises modifying a third value associated with the second parameter included in the second document based on the second value associated with the first parameter.

4. The method of claim 3, wherein the second document comprises a top-level document associated with the current workflow, and the new workflow includes only one document corresponding to the second document.

5. The method of claim 2, further comprising storing the second value associated with the first parameter included in the first document, and then regenerating the second document based on the second value associated with the first parameter.

6. The method of claim 1, wherein generating the parameter tree comprises traversing the first document to extract each parameter included in the first document.

7. The method of claim 6, further comprising, for each extracted parameter, setting a value associated with a node included in the parameter tree and corresponding to the extracted parameter based on a value of the parameter.

8. The method of claim 1, wherein a third parameter included in a third document associated with the current workflow matches the first parameter, and further comprising modifying a value associated with a third node in the parameter tree that corresponds to the third parameter based on the input.

9. The method of claim 8, wherein the first node and the third node are bound to a first variable, and the method comprising determining that the first variable is modified; in response, modifying the value associated with the first node and the value associated with the third node accordingly.

10. A computer system comprising:
a processor;
a memory;
a user interface configured to receive input from a user;
a tree generator configured to generate a parameter tree related to a current workflow, wherein the parameter tree includes a different node corresponding to each parameter included in a document of a plurality of documents associated with the current workflow, wherein each of the plurality of documents comprises one or more functions;
a parameterization module configured to:
modify a first value associated with a first node included in the parameter tree based on an input from the user interface through the user interface, wherein the first node corresponds to a first parameter included in a first document associated with the current workflow;
wherein a second node included in the parameter tree corresponds to a second parameter included in a second document in the current workflow, and wherein the first node is associated with the second node;
a workflow generator configured to generate a new workflow based on evaluating the second document by performing the one or more functions in the second document based on the first value associated with the first node to produce an evaluated second document in response to determining the second node is associated with the first node in the parameter tree.

11. The computer system of claim 10, wherein the parameterization module is configured to modify a second value associated with the first parameter to equal the first value associated with the first node.

12. The computer system of claim 11, wherein the parameterization module is configured to evaluate the second document comprises by modifying a third value associated with the second parameter included in the second document based on the second value associated with the first parameter.

13. The computer system of claim 12, wherein the second document comprises a top-level document associated with the current workflow, and the workflow generator is configured to generate the new workflow to include only one document corresponding to the second document.

14. The computer system of claim 11 wherein the parameterization module is configured to modify a third value associated with the second parameter included in the second document based on the second value associated with the first parameter.

15. The computer system of claim 10, wherein the tree generator is configured to traverse the first document; extract each parameter included in the first document to generate the parameter tree.

16. The computer system of claim 15, wherein the tree generator is configured to, for each extracted parameter, set a value associated with a node included in the parameter tree and corresponding to the extracted parameter based on a value of the parameter.

17. The computer system of claim 10, wherein a third parameter included in a third document associated with the current workflow matches the first parameter, and the parameterization module is configured to modify a value associated with a third node in the parameter tree that corresponds to the third parameter based on the input from the user interface.

18. The computer system of claim 17, wherein the first node and the third node are bound to a first variable and the parameterization module is configured to determine that the first variable is modified; in response, modify the value associated with the first node and the value associated with the third node accordingly.

* * * * *